(12) United States Patent
Larsson et al.

(10) Patent No.: US 6,577,712 B2
(45) Date of Patent: Jun. 10, 2003

(54) DISTRIBUTED VOICE MAIL SYSTEM

(75) Inventors: Gunnar Larsson, Tumba (SE); Patrik Wiss, Stockholm (SE); Lars-Göran Petersen, Tumba (SE); Ulf Ekstedt, Saltsjobaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 09/825,600

(22) Filed: Apr. 4, 2001

(65) Prior Publication Data

US 2001/0036256 A1 Nov. 1, 2001

Related U.S. Application Data

(60) Provisional application No. 60/195,223, filed on Apr. 7, 2000.

(51) Int. Cl.$^7$ .................................................. H04M 1/64
(52) U.S. Cl. ........................ 379/88.17; 379/88.07; 379/88.13; 379/88.18; 379/88.22; 379/900; 379/908
(58) Field of Search ........................ 379/67.1, 68, 76, 379/83, 88.17, 88.04, 88.11, 88.13, 88.16, 88.18, 88.12, 88.22, 88.25, 900, 908, 88.07, 88.08; 455/412, 413, 417, 445, 461

(56) References Cited

U.S. PATENT DOCUMENTS

| | | | | |
|---|---|---|---|---|
| 5,583,920 A | * | 12/1996 | Wheeler, Jr. | 379/88 |
| 5,633,916 A | | 5/1997 | Goldhagen et al. | |
| 5,652,789 A | * | 7/1997 | Miner et al. | 379/201 |
| 5,675,507 A | * | 10/1997 | Bobo, II | 364/514 R |
| 5,742,905 A | * | 4/1998 | Pepe et al. | 455/461 |
| 6,233,318 B1 | * | 5/2001 | Picard et al. | 379/88.17 |
| 6,333,973 B1 | * | 12/2001 | Smith et al. | 379/88.12 |
| 6,477,240 B1 | * | 11/2002 | Lim et al. | 379/67.1 |

FOREIGN PATENT DOCUMENTS

| | | |
|---|---|---|
| EP | 0 845 894 A2 | 6/1998 |
| EP | 0 866 585 A1 | 9/1998 |
| WO | WO 97 49251 A1 | 12/1997 |
| WO | WO 00 67436 A1 | 11/2000 |

* cited by examiner

Primary Examiner—Allan Hoosain

(57) ABSTRACT

A distributed voice mail system in a network includes a server in a control layer of the network and one or more media gateways in a connectivity layer of the network, wherein the server controls resources in the media gateways to provide distributed voice mail services.

16 Claims, 2 Drawing Sheets

DISTRIBUTED VOICE MAIL SYSTEM

This application claims priority under 35 U.S.C. §119(e) to Application No. 60/195,223 filed in The United States of America on Apr. 7, 2000, the entire content of which is hereby incorporated by reference.

BACKGROUND

The present invention is related to a telecommunication system, and more particularly to a distributed voice mail system (VMS) in a telecommunication system.

Universal Mobile Telecommunication Systems (UMTS) provide a third generation (3G), broadband, packet-based network architecture. UMTS is endorsed by major standards bodies and manufacturers as the planned standard for mobile users around the world. The UMTS network transports text, digitized voice, digitized video, and multimedia at data rates up to and possibly higher than 2 Mbps. Once fully implemented, computer and phone users will be able to travel staying connected to the Internet with a consistent set of capabilities. Access is obtained through a combination of terrestrial wireless and satellite transmissions.

UMTS employs a new core architecture, separating network layers horizontally into a call control layer and a connectivity layer. The call control layer contains the call control and session control servers. The connectivity layer handles the transport and manipulation of user plane data. Media Gateways (MGW) operate as nodes in the connectivity layer under the control of servers in the call control layer. The servers communicate with the MGWs using a gateway control protocol (GCP), e.g., H.248.

FIG. 1 illustrates a function of MGWs 110, 120 between different telecommunication networks. An access network 130, a core network 140, and a public network 150 are depicted in FIG. 1. Each network may be owned by different operators and be of a different type, e.g., STM (legacy circuit switched), Asynchronous Transfer Mode (ATM) or Internet Protocol (IP). STM is currently more widely implemented, with ATM and IP currently being deployed. The call control server 100 controls the MGW(s) 110, 120 using a GCP such as H.248. One server 100 can control multiple MGWs 110, 120 or multiple servers 100 can be employed to control one MGW 110, 120. The server 110 handles the call control routing through the network while the MGWs transform the data streams to the format required by the network.

As UMTS evolves, telecommunication networks are also shifting from circuit switched to packet-switched networks. In circuit-switched networks, such as a public switched telephone network (PSTN), the communication circuit (path) for the call is set up and dedicated to the participants in that call. For the duration of the connection, all resources on that circuit are unavailable for other users. Packet-switched networks, in contrast, route relatively small units of data, called packets, through a network based on the destination address contained within each packet. Breaking communication down into packets allows the same data path to be shared among many users in the network. This type of communication between sender and receiver is known as connectionless (rather than dedicated). Voice calls in a packet-switched system are broken down into voice packets that are reassembled at the receiving end.

Current telecommunication systems employ, among other system services, a voice mail system (VMS). A VMS collects, stores and forwards voice messages. For example, calls to a subscriber that is busy, or otherwise unavailable, are diverted to the subscriber's mailbox, where the caller is invited to leave a message by a recorded message. A VMS in current telecommunication system networks is a self-contained network element comprising a set of telecom resources, for example, signaling, dual tone multi-frequency (DTMF) for voice prompting, voice compression/decompression, and storage. Traditional SDH (Synchronous Digital Hierarchy) and PDH (Plesiochronous Digital Hierarchy) is commonly used between a Mobile Switching Center (MSC) and a VMS in first and second generation telecommunication systems.

Accordingly, there is a need to efficiently use the UMTS network architecture to employ a VMS in a third generation telecommunication system.

SUMMARY

The present invention addresses these and other concerns. According to one aspect, a distributed voice mail system in a network, includes a server in a control layer of the network and at least one media gateway in a connectivity layer of the network, wherein the server controls the at least one media gateway to provide voice mail services.

According to another aspect, a method for providing distributed voice mail services in a network includes controlling at least one media gateway in a connectivity layer of the network using a server in a control layer of the network, wherein the server controls the media gateway to provide voice mail services.

According to yet another aspect, a method for providing distributed voice mail services in a network includes controlling at least one media gateway in a connectivity layer of the network using a server in a control layer of the network, wherein the server controls the media gateway to provide voice mail services. A voice mail retrieval call is traversed from the media gateway to the server. Upon receipt of the voice mail retrieval call at the server, one or more corresponding coded voice mail system terminating call messages are retrieved from a storage unit by the server and traversed from the server to the media gateway. The one or more corresponding coded voice mail system terminating call messages are decoded in a codec of the media gateway.

According to still another aspect, a computer program product for providing distributed voice mail services in a network is provided. The computer program product includes a computer-readable storage medium having computer-readable program code means embodied in the medium. The computer-readable program code means includes logic that controls at least one media gateway in a connectivity layer of the network using a server in a control layer of the network, wherein the server controls the media gateway to provide voice mail services.

BRIEF DESCRIPTION OF THE DRAWINGS

The above and other objects, features, and advantages of the present invention will become more apparent in light of the following detailed description in conjunction with the drawings, in which like reference numerals identify similar or identical elements, and in which.

DETAILED DESCRIPTION

Preferred embodiments of the present invention are described below with reference to the accompanying drawings. In the following description, well-known functions and/or constructions are not described in detail to avoid obscuring the invention in unnecessary detail.

The UMTS network architecture is efficiently used in conjunction with the MGW architecture to realize a distributed VMS. The VMS supports mobile network voice mail services, for example, Call Forwarding on Busy to Voice Mail, Call forwarding Unconditional to Voice Mail, Call Deflection, etc. The invention describes the lower layer (user plane) configuration and functionality.

Figure 1:
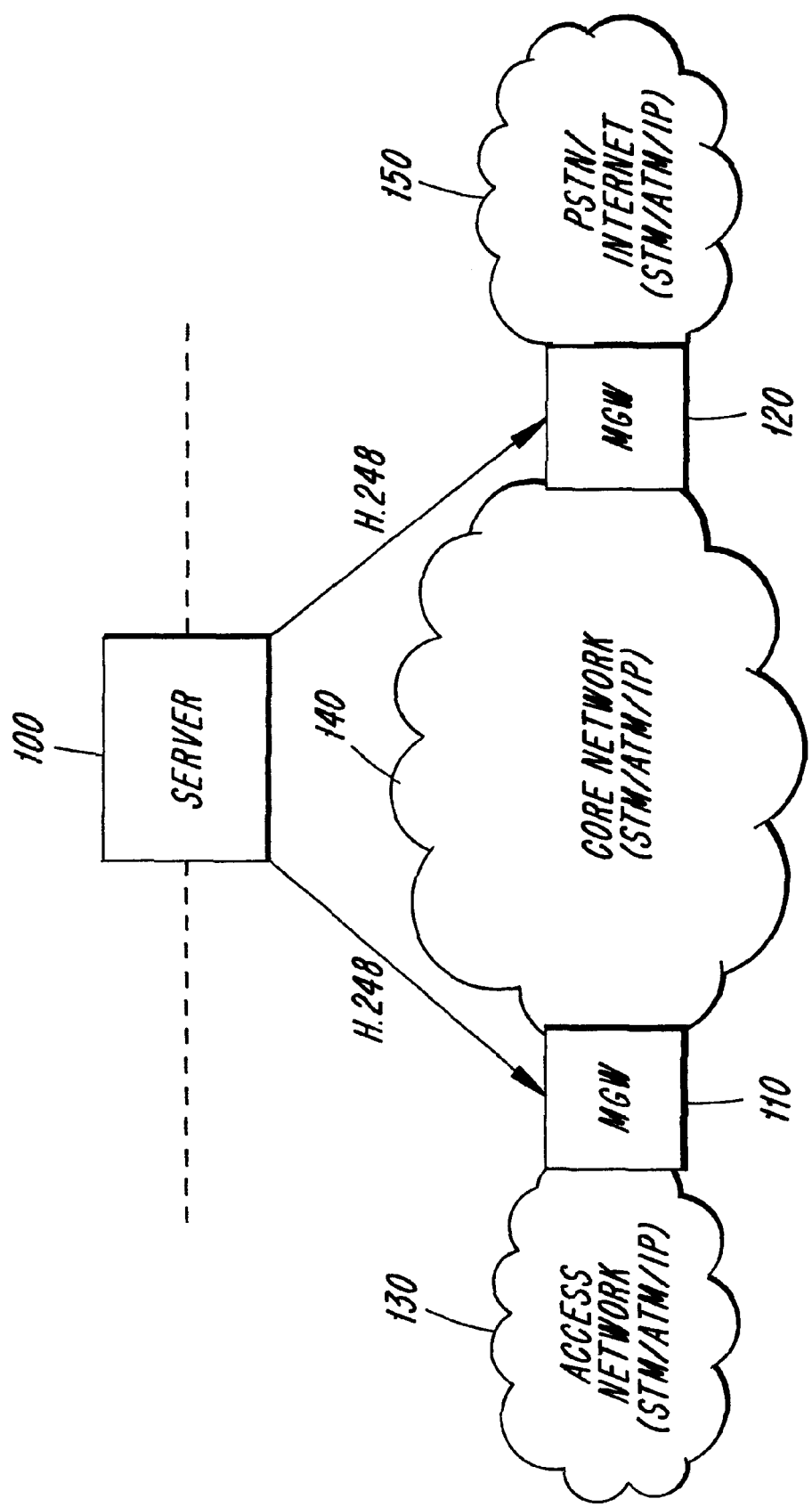
FIG. 1 is a diagram illustrating the function of a MGW.
Figure 2:
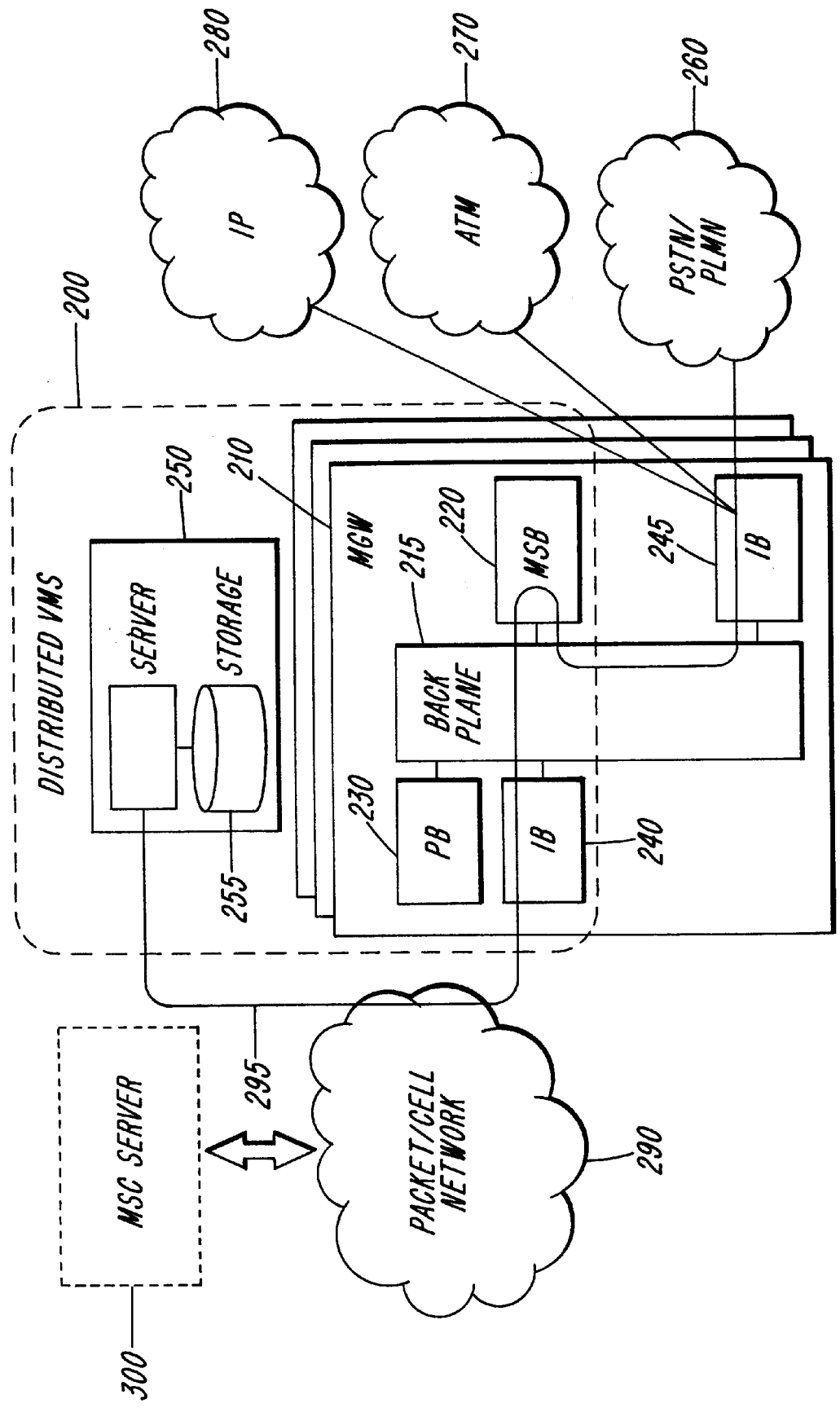
FIG. 2 is a diagram illustrating a distributed VMS in accordance with an embodiment of the invention.

Turning again to the drawings, FIG. 2 illustrates a distributed VMS 200 in accordance with an embodiment of the invention. The VMS 200 includes a server 250 and shared resources within one or more MGWs 210, acting in a client-server relationship. The shared resources include, but are not limited to, a Media Stream Board (MSB) 220, Processor Board (PB) 230, Backplane 215, and Interface Boards (IB) 240, 245.

Each MGW 210 is a self-contained network node that includes a full set of speech and data resources, collectively referred to as Media Stream Applications (MSAs). The MGW 210 conventionally functions to convey media streams from one network to another located in a path from one subscriber to another during a normal call. The invention incorporates the resources of the MGW within a distributed VMS.

The MSAs are individually controlled and separated from the external transmission and addresses (connection endpoints). It is possible today to implement a MSB 220, which can handle several different MSAs on the same physical board. The board could, for example, be implemented with a number of DSPs. Examples of MSAs include a Transcoder (codec), an Echo Canceller (EC), a Tone/DTMF sender/receiver for voice prompting at voice mail retrieval, a Conference Call Device (CCD), an Announcement Machine, and a Data Transmission Interworker (DTI). The Transcoder converts data between different voice coding formats, e.g., between PCM coded and ARM coded voice. The EC suppresses/removes echoes generated in the PSTN. The Tone/DTMF sender/receiver generates and receives tones, e.g., a busy tone or a call in progress tone. The Announcement Machine generates standard messages for announcement to the subscriber, e.g., an error message indicating a dialed number is not in use. The DTI and CCD are not accessed during a VMS session, but are nonetheless relevant to other functions performed by the MGW. The CCD enables multi-party calls. The DTI functions as a modem pool for circuit switched data.

The MGW 210 provides a switching function to connect different MSAs and external connection endpoints, e.g., an IP network 280, an ATM network 270 and/or a PSTN/Internet 260. MGWs are currently being developed for GSM/UMTS networks.

More than one MSA is often needed for a call. For example, a Transcoder (codec) and an EC are both needed for many calls, e.g., for a mobile to PSTN/ISDN call. Thus, MSAs are typically linked in a chain, or so-called call chain. A link can either be an MSA or an IB 240, 245.

An IB 240, 245 is a board used to interface with the external network. The IB 240, 245 terminates the physical layer used in the network and interfaces a space switch used in the node. The space switch performs the physical sending of cells belonging to different connections to different outgoing ETs.

The partitioning of functionality between the ETs and the space switch differs in different implementations. In the simplest case, e.g., for an ATM connection through the node, the ATM cell header indicates which IB 245 a cell should be sent to. The cell is then switched in the space switch to the outgoing IB 245, which is connected to the network. The cell is switched based on the Virtual Path Identifier (VPI) and Virtual Channel Identifier (VCI), which the IB uses to refer to a connection table that indicates to which outgoing IB the cell should be sent.

Switching includes both space switching and logical switching. Logical switching is performed when the VPI/VCI value is changed, e.g., by adding information to the cell. This information is used by the space switch to route to the cell to the correct IB 245. The VPI/VCI values may be changed in either or both an incoming or an outgoing IB 245, 240.

When the MGW 210 is used to perform an MSA, an MGW 210 internal connection, such as backplane 215, is used to connect the IB 245 to the MSB 220. MSAs are executed in processors, a number of processors typically being included on a board. A plurality of boards are included in a magazine. A number of magazines are included in a node. In most existing implementations of MSAs, there are dedicated boards for each MSA, or at least for many MSAs.

The MGW 210 resources are dynamically allocated to the distributed VMS 200, similar to other applications supported by the MGW 210. The resources allocated can be distributed among multiple boards. The resource allocation is controlled by a Media Stream Resource Manager (MSRM), which manages all of the processors on a respective MSB 220 as a resource pool. The MSRM allocates a specific MSB 220 for the processing of arriving packets and the subsequent execution of a MSA in the call chain for the packet, depending on the load characteristics for that MSB 220.

The server 250 is preferably a commercial server with a high capacity storage 255. Alternatively, one or more PBs 230 in the MGW 210 can be configured as a server.

In operation, the VMS 200 functions to terminate calls that have been diverted to the subscriber's mailbox, where the caller is invited to leave a message by a recorded message. Calls originating in a PSTN 260 are received at the IB 245 and coded in the MSB 220 codec. A connection 295 is established between the MGW 210 (via IB 240) and the server 250 via a packet/cell network 290. The coded message is traversed from the MGW 210 to the server 250 via the connection 295. The messages may be coded and traversed with generous limits for both delay and delay variation, for example every 20 ms, according to the limitations of the server's buffer size. The coded message is stored in the storage 255 of the server 250.

Ideally, the codec uses an algorithm compatible with the mobile station of the called subscriber. However, the standards for GMS/UMTS are currently silent regarding VMS terminating calls. A best effort technique can be employed by using an algorithm currently dominating the subscriber's PLMN, i.e., adaptive multi-rate (AMR). However, using the dominating algorithm will result in deteriorated speech quality for mobile stations not supporting the algorithm. Alternatively, the MSB 220 codec and mobile stations can support a current state of the art algorithm.

When a call is originated in a PLMN 260, the message is already in a coded format and can be through-connected in the MSB 220 without change. The coded message is traversed from the MGW 210 to the server 250 via the connection 295. The coded message is stored in the storage 255 of the server 250 in the received format, maintaining the best possible speech quality.

When a subscriber calls to retrieve the voice mail messages, the connection 295 is established between the MGW 210 (IB 240) and the server 250 via the packet/cell network 290. The coded message stored in the server is traversed from the server 250 to the MGW 210 via the connection 295. The coded messages are sent in bursts to minimize both delay and delay variation according to the limitations of the MGW's buffer size. The MSB 220 decodes the received coded message to another format as needed. The decoded message is then traversed from the MGW to the PSTN/PLMN 260. During voice mail retrieval, the required DTMF functionality is provided by the MSB.

The invention provides several advantages. The distributed VMS 200 is a logical node comprising the server 250 and resources from one or more MGWs 210, in one or more networks. The resources in the MGW(s) 210, in the one or more networks, can be dynamically allocated to the distributed VMS 200, i.e., no resources are permanently allocated to the distributed VMS 200. Accordingly, all the available MGW resources can be pooled, thus increasing the statistical usage of the resources and making a more efficient use of the overall network resources.

A commercial server may be used, which may also be a shared resource in the network between other telecommunication applications, multiple networks, and different types of networks. The server does not need to perform many of the VMS related functions, since they are performed by the MGW 210. For example, the server 250 does not have to perform speech coding/decoding functions or DTMF functions, since they are performed by the MSB 220 in the MGW 210. Compressed voice is traversed between the MGW 210 and the server 250, which reduces the amount of bandwidth required compared with a conventional pulse code modulation (PCM) technique employed by an MSC and stand alone VMS solution. This also reduces the Quality of Service (QoS) requirements on the connection between the MGW(s) 210 and server 250. The connection need not support real time transfer, since the buffers compensate for any delay. Accordingly, existing ATM or IP networks may be used to transfer the data. The Internet may be used as a very cost efficient transport option, assuming security issues are addressed. Also, signaling can be carried on an IP network. The server may also store the announcement machine messages using the same techniques.

The MSC Server 300 handles call control with wireless subscribers during a call control phase. For example, when a call is redirected to the VMS because a called mobile subscriber is busy, the MSC initiates an alert to the mobile subscriber, via associated Mobile Services Switching Centers and Base Stations, indicating there is a stored message to retrieve.

While only voice calls are described above, it will be understood that the same principles can be applied to services using other data formats, such as fax and video messaging services.

It will be appreciated that the steps of the methods illustrated above may be readily implemented either by software that is executed by a suitable processor or by hardware, such as an application-specific integrated circuit (ASIC).

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A distributed voice mail system in a packet-based mobile communications network, comprising:
    a server in a control layer of the network, said server including:
        storage means for storing voice mail messages for a mobile subscriber;
        accessing means for storing the voice mail messages in the storage means and retrieving the voice mail messages from the storage means; and
        server communication means for sending and receiving the voice mail messages through a packet-based network; and
    at least one media gateway (MGW) in a connectivity layer of the network, said MGW being controlled by the server, and including:
        interfacing means for receiving calls and voice mall messages from calling subscribers and the mobile subscriber;
        coding means connected to the interfacing means for coding the received voice mail messages, if necessary, utilizing a coding technique compatible with the mobile communications network, said coding means coding the voice mail message if the message is not compatibly coded for the mobile communications network, and through-connecting the voice mail message without change if the message is already compatibly coded for the mobile communications; and
        MGW communication means for sending the coded voice mail messages through the packet-based network to the server, and receiving the coded voice mail messages from the server;

wherein the server controls the at least one MGW to provide voice mail services to the mobile subscriber.

2. The distributed voice mail system of claim 1, wherein the server controls the at least one MGW to dynamically allocate resources for voice mail services.

3. The distributed voice mail system of claim 2 wherein the dynamically allocated resources in the MGW for voice mail services include at least one of a transcoder (codec) for coding/decoding messages, an echo canceller, a tone/dual tone multi-frequency (DTMF) sender/receiver for voice prompting, and an announcement machine.

4. The distributed voice mail system of claim 1, wherein the MGW includes an announcement machine for generating standard messages to subscribers, and the coding means includes means for providing dual tone multi-frequency (DTMF) functionality for the mobile subscriber to request retrieval of the voice mail messages, thereby initiating a voice mail retrieval call from the media gateway to the server.

5. The distributed voice mail system of claim 4, wherein the coding means includes means for decoding coded voice mail messages that have been retrieved from the server.

6. The distributed voice mail system of claim 1, wherein the MGW also includes means for providing facsimile and video messaging services under control of the server.

7. A method of providing distributed voice mail services for a mobile subscriber operating in a packet-based mobile communications network having at least one media gateway (MGW) in a connectivity layer of the network and a server in a control layer of the network, said method comprising the steps of:

receiving in the MGW, a call from a calling subscriber to the mobile subscriber;

receiving in the MGW, a voice mail message from the calling subscriber for the mobile subscriber;

coding the voice mail message, if required, with a codec in the MGW, said coding step including the steps of:
coding the voice mail message with the codec if the message is not compatibly coded for the mobile communications network; and
through-connecting the voice mail message without change if the message is already compatibly coded for the mobile communications network;

sending the coded voice mail message through a packet-based network from the MGW to the server; and storing the voice mail message in a storage device by the server for later retrieval by the mobile subscriber.

8. The method of claim 7, further comprising the steps of:

receiving in the MGW, a voice mail retrieval call from the mobile subscriber;

traversing the voice mail retrieval call from the MGW to the server;

retrieving the voice mail message by the server;

sending the retrieved voice mail message through the packet-based network from the server to the MGW;

decoding the voice mail message, if required, with the codec in the MGW; and playing the voice mail message by the MGW to the mobile subscriber.

9. The method of claim 7, further comprising controlling the MGW by the server to provide facsimile and video messaging services.

10. The method of claim 7 further comprising controlling the MGW with the server.

11. The method of claim 10 wherein the step of controlling the MGW with the server includes controlling the MGW to dynamically allocate resources for voice mail services.

12. The method of claim 7, wherein the step of coding the voice mail message with the codec includes coding the message utilizing an algorithm that is compatible with the called subscriber's mobile station.

13. A computer program product for providing distributed voice mail services in a packet-based mobile communications network, the computer program product comprising:

a first computer-readable storage medium having first computer-readable program code means embodied in said medium, said first computer-readable program code means including logic that controls at least one media gateway (MGW) in a connectivity layer of the network to utilize MGW resources to receive, code, and traverse voice mail messages between subscribers and a controlling server in a control layer of the network, said MGW control logic controlling the MGW to code a particular voice mail message utilizing a coding technique compatible with the mobile communications network if the message is not compatibly coded for the mobile communications network, and to through-connect the particular voice mail message without change if the message is already compatibly coded for the mobile communications network; and a second computer-readable storage medium having second computer-readable program code means embodied in said medium, said second computer-readable program code means including logic that controls the server to receive voice mail messages from the MGW, store the messages in a storage device, retrieve the messages upon request, and traverse the retrieved messages to the MGW.

14. The computer program product of claim 13, wherein the logic that controls the media gateway is operable to dynamically allocate the MGW resources for voice mail services.

15. The computer program product of claim 14, wherein the dynamically allocated MGW resources for voice mail services are at least one of a transcoder (codec) for coding/decoding messages, an echo canceller for suppressing or removing echoes, a tone/dual tone multi-frequency (DTMF) sender/receiver for voice prompting, and an announcement machine for playing prerecorded announcements to subscribers.

16. The computer program product of claim 13, wherein the logic that controls the media gateway is operable to provide facsimile and video messaging services.

* * * * *